INVENTORS
ARTHUR J. TALAMINI, JR.
RICHARD C. PALMER
BY
ATTORNEYS

Patented Dec. 1, 1953

2,661,421

UNITED STATES PATENT OFFICE 2,661,421

SWEEP GENERATOR PROTECTION CIRCUIT

Arthur J. Talamini, Jr., Caldwell Township, Essex County, and Richard C. Palmer, Nutley, N. J., assignors to Allen B. Du Mont Laboratories, Inc., Clifton, N. J., a corporation of Delaware Application June 28, 1950, Serial No. 170,832

5 Claims. (Cl. 250—27)

This invention relates to generators of electrical oscillations and more particularly to driven, sawtooth-wave generators.

In driven sawtooth generators synchronized by repetitive voltage pulses which have a shorter period between successive pulses than one complete oscillation of the sawtooth-wave, it is necessary that some means be provided to prevent the generator from triggering before the completion of the sawtooth oscillation. An oscillation of a sawtooth wave may be defined to include only a linear "go" period and a "return" period, which need not be linear, without regard to the time between the end of a "return" period and the beginning of the next "go" period. It is also frequently desirable to provide driven sweeps of variable durations which can be triggered by pulses occurring over a given range of repetition rates. Under such conditions the fastest sweeps will be completed including both the "go" and "return" periods before the next trigger pulse comes along, consequently, there is no reason to provide any protection circuits for fast sweep rates.

It is an object of this invention to provide an improved protection circuit for oscillation generators.

Other objects are to obtain a stable driven sweep generator, to provide a protection circuit for a given sweep oscillator, and to provide a protection circuit which is automatically rendered inoperative for sweep rates above a predetermined minimum.

Still further objects and advantages will in part be obvious and in part appear hereinafter.

The invention accordingly is embodied in a protection circuit for a sweep generator wherein a composite wave of a square pulse is combined with an integration of the sawtooth oscillation to gate synchronizing pulses.

Figure 1:
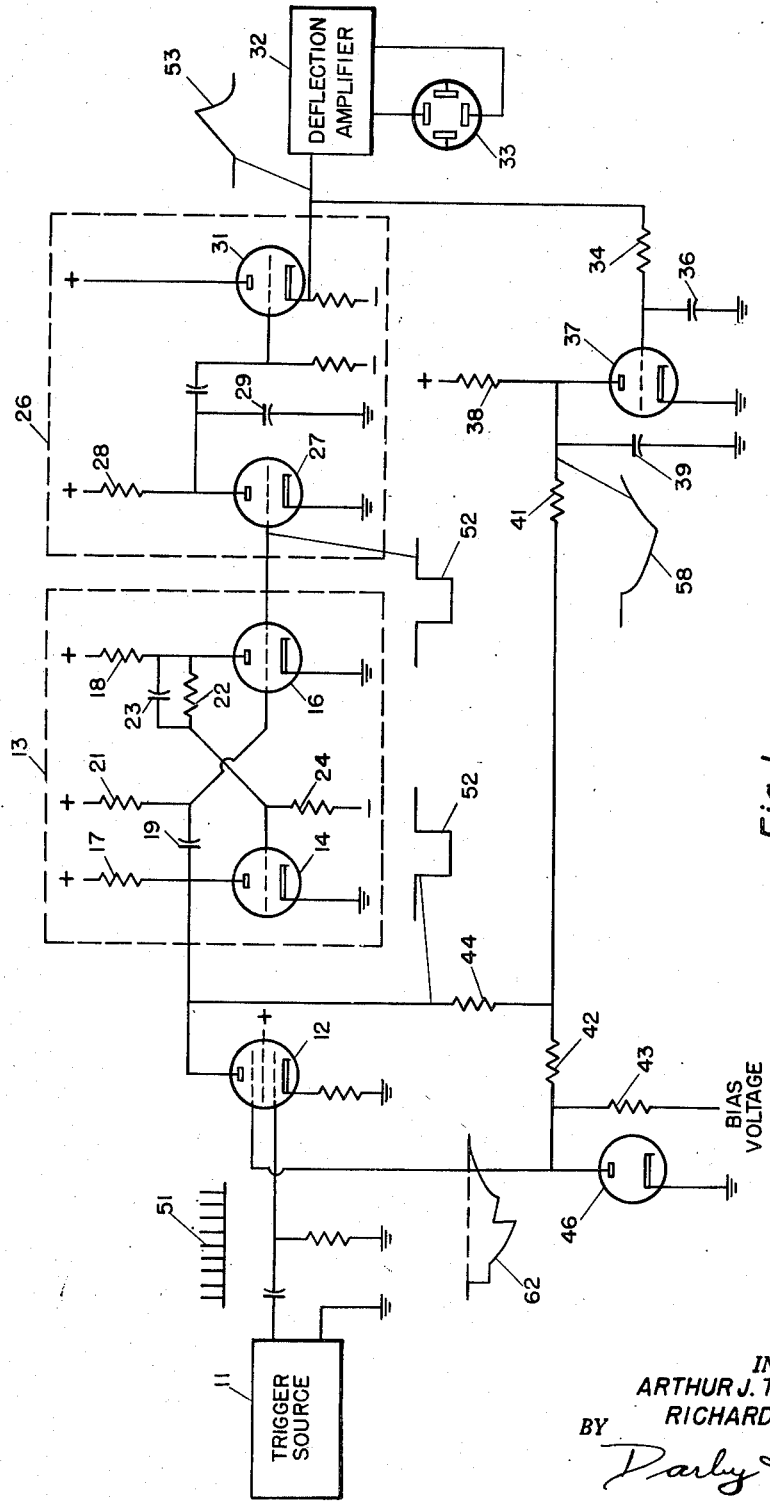
Figure 1 shows a driven sweep generator embodying this invention.

In Figure 1 a triggering pulse source 11 is connected to the control grid of a gated tube 12, which is the synchronizing tube for multivibrator 13, which consists of a pair of tubes 14 and 16 having plate loads 17 and 18, respectively, a first feedback path comprising a condenser 19 and a resistor 21 between the plate of tube 14 and the grid of tube 16, and a second feedback path comprising a parallel resistance capacitance circuit 22, 23 and a resistor 24 between the plate of tube 16 and the grid of tube 14. A driven sweep generator 26 comprising a saw-maker tube 27 having a plate load 28, a condenser 29 in parallel with the tube 27, and a cathode follower output tube 31 is connected to the multivibrator 13. The cathode of the amplifier 31 is applied to a deflection amplifier 32 which in turn is connected to the horizontal deflection plates of cathode ray tube 33.

The output of the cathode follower 31 is also fed to an integrating network comprising a resistor 34 and a condenser 36, which in turn is connected to the grid of tube 37. A condenser 39 is connected between the junction of the plate of tube 37 and the plate load 38 and ground, and resistor 41 connects this junction to the top of a potentiometer comprising resistor 42 and second resistor 43 having its lower end connected to a source of bias voltage. Resistor 44 is connected from the plate of multivibrator tube 14 to the junction of the resistors 41 and 42. The plate of a diode clipper 46 is connected to the junction of resistors 42 and 43 and the cathode is connected to another source of constant voltage, such as ground. The plate of the diode 46 is also connected to the suppressor grid of the gated amplifier 12.

The operation of the circuit can best be explained by reference to the timing diagram Figure 2 along with the electrical diagram in Figure 1.

The trigger source 11 supplies voltage pulses 51 to the control grid of the tube 12 where they are inverted and amplified and used to trigger the multivibrator 13 by reducing the voltage on the grid of tube 16. The rectangular output voltage wave form 52 of the multivibrator 13 is available at the plate of the tube 14 as well as at the grid of the tube 16 and is negative in polarity. This rectangular pulse 52 is applied to the grid of the tube 27 to bias said tube to cutoff thus allowing the condenser 29 to charge through the resistor 28. The time constant of the resistor 28 and the condenser 29 is generally chosen to have such a value as to allow the condenser 29 to charge to only a small proportion of its possible voltage by the time the pulse 52 has passed thus producing the linear "go" period of the sawtooth voltage 53. At the end of the pulse 52 the tube 27 resumes conduction and acts like a low resistance, discharging the condenser 29 and preparing it for a new sawtooth oscillation. It will be seen that the trailing edge or "return" period of the wave form 53 is not perpendicular to the base line. This is due to the fact that the tube 27 is equivalent to a very low but nevertheless a finite resistance.

Figure 2:
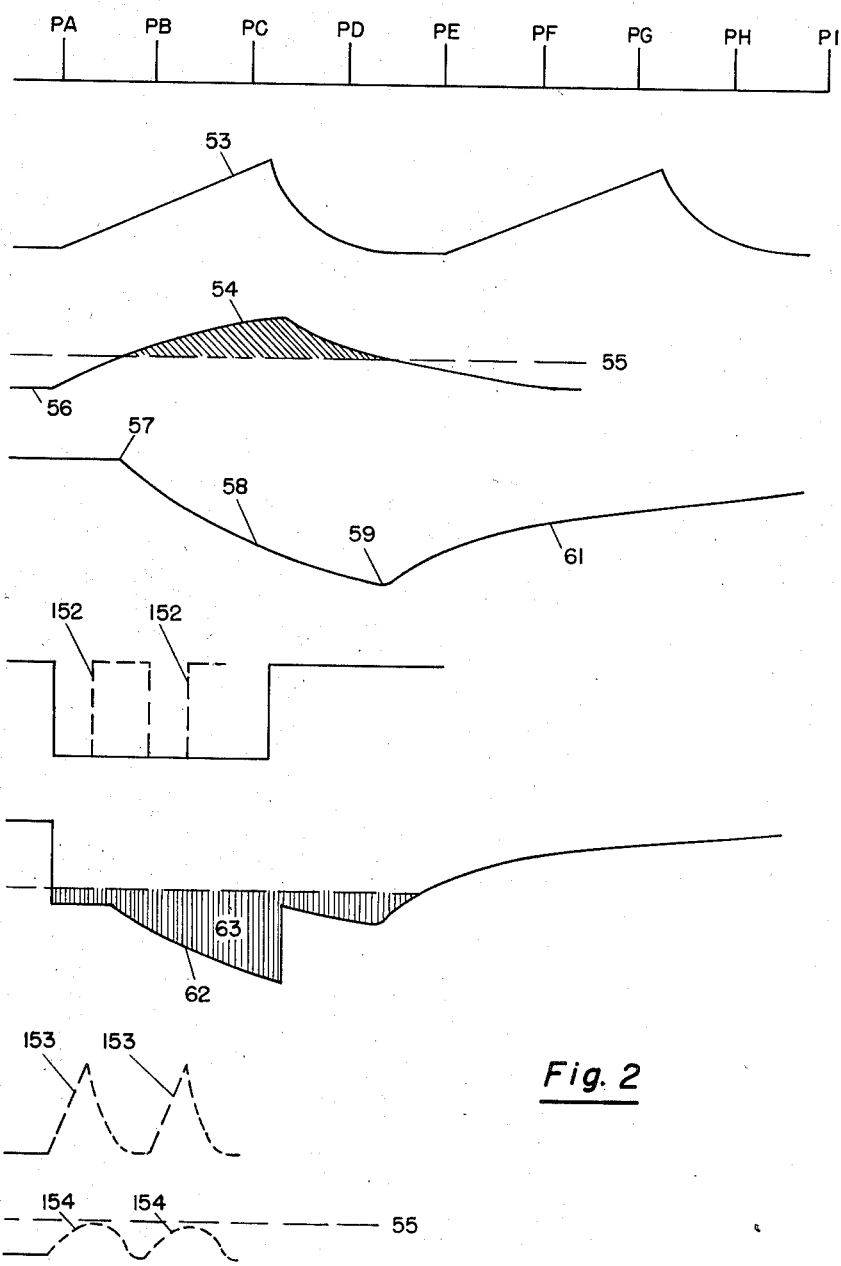
Figure 2 is a timing diagram showing the wave forms obtained in this driven sweep generator.

Because of the time required to discharge the condenser 29 to its resting voltage from which a new sawtooth oscillation may be started, it is necessary to prevent the multivibrator 13 from triggering on the pulse PB or any of the other pulses between PA and PE, as shown in Figure 2.

These undesired pulses are eliminated by suitably deforming the voltage 53 and feeding it back to gate the amplifier 12. This deformation comprises, first, integration of the voltage 53 by means of the resistor 34 and condenser 36 which results in a voltage 54 being applied to the grid of the tube 37. The plate voltage and bias voltage on the tube 37 are set so as to clip the wave 54 at the level 55 above the base 56. The reason for this clipping will become apparent. As a result of this clipping action, tube 37 does not start to draw plate current until the time 57 at which time the plate begins to decrease from its resting voltage, which is the same as the B plus voltage. This voltage decrease produces a wave having the initial shape 58 which continues until the time 59, determined by the cutoff characteristics of the tube 37. Beginning at the time 59 the condenser 39 starts to discharge through the resistor 38, which is preferably chosen to have a value considerably higher than the plate impedance of the tube 37. Therefore, it is desirable to add the rectangular pulse 52 to this voltage 58 and the resultant wave 62 is used to gate the tube 12 by applying a negative bias to the suppressor grid.

It is obvious that if the wave 62 were used just as it is as a gate, the length of the gate would be excessive and furthermore the reopening of the gate would be indeterminate, occurring one time for pulse PH and another time perhaps not until pulse PI or PJ. In order to be able to retrigger the sweep circuit on the pulse PE the wave 62 is clipped and only the bottom part 63, which is shown shaded, is used to gate the tube 12. The essential precaution to determine the clipping level set by the diode 46 and the bias voltage 64 is that the portion 63 of the voltage wave 62 must have a duration longer than the complete wave 53 including both the "go" period and the "return" period.

Figure 2 also shows some short duration sweep oscillations 153 which are obtained by changing the time constants of the multivibrator 13 and the values of the resistor 28 and the condenser 29 or both. It will be seen that these waves 153 are completed in less than the time between the triggering pulse PA and the pulse PB. Consequently there is no need for any protection circuit. The protection circuit is automatically cut out by the setting of the bias level 55 for, as shown in Figure 2, the voltage wave 154 appearing on the grid of the tube 37 and corresponding to the voltage 54 has such a short time to rise that it does not exceed the level 55. Consequently the tube 37 never comes into conduction and no voltage wave 58 is produced.

It will be obvious that modifications may be made in the circuit of Figure 1 without departing from the spirit of the invention as pointed out by the following claims.

What is claimed is:

1. A driven sawtooth voltage oscillator protection circuit comprising a gating tube, a source of synchronizing voltage signals connected to an input electrode of said tube, means to gate out certain of said synchronizing signals, and a generator of sawtooth voltage oscillations triggered by others of said synchronizing signals, said means for getting out synchronizing signals comprising an integrating circuit connected to said generator to integrate each of said oscillations, a clipping circuit connected to said integrating circuit to clip the resulting integrated oscillations, and a connection between the output of said clipping circuit and an input electrode of said gating tube.

2. A driven sawtooth voltage oscillator protection circuit comprising a gating tube, a source of synchronizing voltage signals connected to an input electrode of said tube, means to gate out certain of said synchronizing signals, and a generator of sawtooth voltage oscillations triggered by others of said synchronizing signals, said means comprising an integrating circuit connected to the output of said oscillator to integrate each of said oscillations, a clipping circuit connected to said integrating circuit to clip the resulting integrated oscillations, a second integrating circuit connected to the output of said clipping circuit, and a connection between the output of said second integrating circuit and an input electrode of said gating tube.

3. A driven sawtooth voltage oscillator protection circuit comprising a gating tube, a source of synchronizing voltage signals connected to an input electrode of said tube, means to gate out certain of said synchronizing signals, a square wave voltage generator triggered by others of said synchronizing signals, and a generator of sawtooth voltage oscillations connected to said square wave generator, said means comprising an integrating circuit to integrate each of said sawtooth oscillations, a clipping circuit to clip the resulting integrated oscillations, a second integrating circuit connected to the output of said clipping circuit, a mixing circuit to mix the output of said second integrating circuit with the output of said square wave generator and connection between an input electrode of said gating tube and said mixing circuit.

4. A driven sawtooth voltage oscillator protection circuit comprising a gating tube, a source of synchronizing voltage signals connected to an input electrode of said tube, means to gate out certain of said synchronizing signals, and a generator of sawtooth voltage oscillations triggered by others of said synchronizing signals, said means comprising a first integrating circuit connected to said last named generator to integrate each of said oscillations, a clipping circuit connected to said first integrating circuit to clip the resulting integrated oscillations, a second integrating circuit to integrate the resulting clipped oscillations, a second clipping circuit connected to said second integrating circuit and a connection between said second clipping circuit and an input electrode of said gating tube.

5. A driven sawtooth voltage oscillator protection circuit comprising a gating tube, a source of synchronizing voltage signals connected to an input electrode of said tube, means to gate out certain of said synchronizing signals, a square wave voltage generator triggered by others of said synchronizing signals, and a generator of sawtooth voltage oscillations connected to said square wave generator, said means comprising an integrating circuit to integrate each of said sawtooth oscillations, a first clipping circuit to clip the resulting integrated oscillations, a second integrating circuit connected to the output of said first clipping circuit, a mixing circuit to mix the output of said second integrating circuit with the output of said square wave generator, a second clipping circuit connected to said mixing circuit, and a connection between an input electrode of said gating tube and said second clipping circuit.

ARTHUR J. TALAMINI, JR.
RICHARD C. PALMER.

References Cited in the file of this patent

UNITED STATES PATENTS

| Number | Name | Date |
|---|---|---|
| 2,141,343 | Campbell | Dec. 27, 1938 |
| 2,365,583 | Nagel | Dec. 19, 1944 |
| 2,412,485 | Whiteley | Dec. 10, 1946 |
| 2,468,058 | Greig | Apr. 26, 1949 |
| 2,480,599 | Oxford | Aug. 30, 1949 |
| 2,490,039 | Earp | Dec. 6, 1949 |
| 2,557,636 | Crumrine | June 19, 1951 |
| 2,594,916 | Gulnac | Apr. 29, 1952 |
| 2,595,667 | Gaines | May 6, 1952 |